(12) United States Patent
Mo et al.

(10) Patent No.: US 11,112,946 B2
(45) Date of Patent: Sep. 7, 2021

(54) INTERFACE INFORMATION DISPLAY METHOD AND APPARATUS

(71) Applicants: Beijing Jingdong Shangke Information Technology Co., Ltd., Beijing (CN); Beijing Jingdong Century Trading Co., Ltd., Beijing (CN)

(72) Inventors: Wen Mo, Beijing (CN); Jiannan Xiong, Beijing (CN); Lei Bi, Beijing (CN)

(73) Assignees: Beijing Jingdong Shangke Information Technology Co., Ltd., Beijing (CN); Beijing Jingdong Century Trading Co., Ltd., Beijing (CN)

( * ) Notice: Subject to any disclaimer, the term of this patent is extended or adjusted under 35 U.S.C. 154(b) by 100 days.

(21) Appl. No.: 16/334,704

(22) PCT Filed: Jul. 14, 2017

(86) PCT No.: PCT/CN2017/092993
§ 371 (c)(1),
(2) Date: Mar. 19, 2019

(87) PCT Pub. No.: WO2018/049907
PCT Pub. Date: Mar. 22, 2018

(65) Prior Publication Data
US 2019/0235711 A1 Aug. 1, 2019

(30) Foreign Application Priority Data
Sep. 19, 2016 (CN) .......................... 201610832163.5

(51) Int. Cl.
*G06F 3/048* (2013.01)
*G06F 3/0483* (2013.01)
(Continued)

(52) U.S. Cl.
CPC .......... *G06F 3/0483* (2013.01); *G06F 3/0482* (2013.01); *G06F 3/0484* (2013.01);
(Continued)

(58) Field of Classification Search
CPC .. G06F 3/0483; G06F 3/04886; G06F 3/0482; G06F 3/0485; G06F 9/451;
(Continued)

(56) References Cited

U.S. PATENT DOCUMENTS 7,765,568 B1 * 7/2010 Gagnon ................. H04H 60/25
715/787
2004/0054968 A1 * 3/2004 Savage ............... G06F 16/9577
715/205
(Continued)

FOREIGN PATENT DOCUMENTS

CN 101192230 A 6/2008
CN 102929557 A 2/2013
(Continued)

OTHER PUBLICATIONS

International Search Report and Written Opinion dated Sep. 7, 2017 in corresponding International Patent Application No. PCT/CN2017/092993 (15 pages).

*Primary Examiner* — Haoshian Shih
(74) *Attorney, Agent, or Firm* — Nixon Peabody LLP

(57) ABSTRACT

An interface information display method and apparatus are provided. The method includes: in a list display state, if a click on a list item is detected, performing operations including: acquiring object information and a position of the clicked list item; generating a screenshot image of a current page; displaying the screenshot image in full screen, displaying a first mask layer on the screenshot image, and displaying a second mask layer on the first mask layer; shrinking the screenshot image to a predetermined ratio,
(Continued)

acquiring an object thumbnail and detailed information from the object information, displaying, in a predetermined size, the object thumbnail on the second mask layer, and displaying the detailed information in a blank area on the second mask layer; and returning to the list display state when an area of the first mask layer non-overlapping with the second mask layer is clicked.

11 Claims, 7 Drawing Sheets

(51) Int. Cl.
| | | |
|---|---|---|
| *G06F 3/0482* | (2013.01) | |
| *G06F 3/0488* | (2013.01) | |
| *G06F 3/0484* | (2013.01) | |
| *G06F 9/451* | (2018.01) | |
| *G06F 3/0485* | (2013.01) | |
| *G06T 13/80* | (2011.01) | |

(52) U.S. Cl.
CPC .......... *G06F 3/0485* (2013.01); *G06F 3/0488* (2013.01); *G06F 3/04886* (2013.01); *G06F 9/451* (2018.02); *G06T 13/80* (2013.01); *G06F 2203/04804* (2013.01); *G06T 2200/24* (2013.01)

(58) Field of Classification Search
CPC ................. G06F 3/0484; G06F 3/0488; G06F 2203/04804; G06F 2203/24; G06T 13/18; G06T 13/80
See application file for complete search history.

(56) References Cited

U.S. PATENT DOCUMENTS

2010/0115398 A1   5/2010  Yi
2016/0179328 A1*  6/2016  Yang ..................... G06F 3/0488
                                                           715/863

FOREIGN PATENT DOCUMENTS

| CN | 104571813 A | 4/2015 |
| CN | 105930489 A | 9/2016 |
| CN | 106484242 A | 3/2017 |

* cited by examiner

Fig. 4b

INTERFACE INFORMATION DISPLAY METHOD AND APPARATUS

CROSS-REFERENCE TO RELATED APPLICATIONS

This application is a national stage of International Application No. PCT/CN2017/092993, filed on Jul. 14, 2017, which claims priority to Chinese Patent Application No. "201610832163.5" filed on Sep. 19, 2016. Both of the aforementioned applications are incorporated herein as a whole.

TECHNICAL FIELD

The present disclosure relates to the field of information display technology, and specifically to a method and apparatus for displaying interface information.

BACKGROUND

At present, for application software of a touch device, it is often necessary to display details of an information object, especially display details of a given information object to which an object list jumps.

In the existing technology, the technical solution is mainly to display a detail page by jumping between pages.

The technical solution of displaying the detail page by jumping between the pages includes: displaying a list of items on a list page, jumping to the detail page corresponding to the object to display details of the clicked object, in response to clicking the list item; and jumping back to the list page after clicking a back button in the detail page.

However, the existing technology has the following defects.

The list page and the detail page belong to two different pages. In the process of displaying the detail page and returning to the list page, it is necessary to jump between the two pages. During this period, it is required to invoke a lot of underlying page calling signaling, resulting in a low operational efficiency. Moreover, on a handheld touch device, the detail page is generally an independent page. In general, the back button is set at the upper left corner of the detail page. It is difficult to touch the back button of the handheld touch device using a finger, which is very inconvenient for the user to operate, resulting in an unsmooth user operation and a low efficiency.

SUMMARY

In view of this, the main purpose of the present disclosure is to provide a method for displaying interface information, to improve an operational efficiency.

The technical solution of the present disclosure is implemented as follows.

A method for displaying interface information includes:
performing an operation, in response to detecting a click on a list item in a display list state, the operation including:
acquiring object information and a position of the clicked list item;
performing a screen capture on a current page to generate a screenshot image;
displaying the screenshot image in full screen, displaying a first mask layer on the screenshot image, and displaying a second mask layer on the first mask layer, a length of the second mask layer being smaller than a length of the first mask layer;
shrinking the screenshot image from full screen to a predetermined ratio of an original size, acquiring an object thumbnail from the object information, displaying, in a predetermined size, the object thumbnail at a predetermined position on the second mask layer, acquiring detailed information from the object information, and displaying the detailed information in a blank area on the second mask layer; and
returning to the list display state in response to clicking an area of the first mask layer non-overlapping with the second mask layer.

In a preferred embodiment, the first mask layer is initially in a transparent state, and the second mask layer is initially in a transparent state. When the object thumbnail is displayed on the second mask layer, a transparency of the first mask layer is reduced to a first specified value. When the detailed information is displayed on the second mask layer, a transparency of the second mask layer is reduced to a second specified value. The first specified value is greater than the second specified value.

In a preferred embodiment, the second specified value is 0.

In a preferred embodiment,
the shrinking the screenshot image from full screen to a predetermined ratio of an original size is specified as an animation tweening motion;
and/or the displaying, in a predetermined size, the object thumbnail at a predetermined position on the second mask layer is specified as: moving gradually the object thumbnail from a position where the object thumbnail is in the list display state to the predetermined position on the second mask layer and changing gradually a size of the object thumbnail to the predetermined size using the animation tweening motion;
and/or reducing the transparency of the first mask layer to the first specified value is specified as: changing gradually the first mask layer from the initial transparent state to the transparency of the first specified value using the animation tweening motion;
and/or reducing the transparency of the second mask layer to the second specified value is specified as: changing gradually the second mask layer from the initial transparent state to the transparency of the second specified value using the animation tweening motion.

In a preferred embodiment, the returning to the list display state in response to clicking an area of the first mask layer non-overlapping with the second mask layer includes:
hiding the detailed information in the second mask layer, restoring the transparency of the second mask layer to the initial transparent state, and then hiding the second mask layer;
zooming the size of the object thumbnail in the detail page to a size of a list thumbnail in the list display state, and moving the thumbnail from the position of the thumbnail in the detail page to the position of the corresponding list item in the list display state;
restoring the first mask layer from a current transparency to the initial transparent state, and then hiding the first mask layer; and
enlarging the shrunk screenshot image to be identical to a screen in size, and then hiding the screenshot image.

In a preferred embodiment, the first mask layer is a black mask layer and the second mask layer is a white mask layer.

In a preferred embodiment, the method further includes:
step 1A, when a scrolling event occurs in an area of the second mask layer or the object thumbnail, proceeding to step 1B:

step 1B, determining whether a distance between coordinates of the second mask player and a top position of the page is reduced and reaches a first specified threshold, and performing 1C if the distance is reduced and reaches the first specified threshold, otherwise, proceeding to step 1D;

step 1C, shrinking gradually and displaying the object thumbnail with a scrolling operation, hiding the object thumbnail at last, and setting an object name of the clicked list item as a title of the current page;

step 1D, determining whether the distance between the coordinates of the second mask player and the top position of the page is enlarged and reaches a second specified threshold, and proceeding to step 1E if the distance is enlarged and reaches the second specified threshold, otherwise, returning to step LA; and step 1E, hiding a title bar, and enlarging gradually and displaying the object thumbnail with a scrolling operation.

An apparatus for displaying interface information includes:

a list display module, configured to display a list state, acquire, if a click on a list item is detected, object information and a position of the clicked list item, perform a screen capture on a current page to generate a screenshot image, and trigger a detail display module; and the detail display module, configured to display the screenshot image in full screen, display a first mask layer on the screenshot image, display a second mask layer on the first mask layer, a length of the second mask layer being smaller than a length of the first mask layer, shrink the screenshot image from full screen to a predetermined ratio of an original size, acquire an object thumbnail from the object information, display, in a predetermined size, the object thumbnail at a predetermined position on the second mask layer, acquire detailed information from the object information, display the detailed information in a blank area on the second mask layer, and trigger the list display module to display the list state when a non-overlapping area of the first mask layer and the second mask layer is clicked on.

In a preferred embodiment, the first mask layer is initially in a transparent state, and the second mask layer is initially in a transparent state.

The detail display module is further configured to: reduce a transparency of the first mask layer to a first specified value when the object thumbnail is displayed on the second mask layer; and reduce a transparency of the second mask layer to a second specified value when the detailed information is displayed on the second mask layer, the first specified value being greater than the second specified value.

In a preferred embodiment, the second specified value is 0.

As compared with the existing technology, in the present disclosure, the detail display for the object of the clicked list item is implemented on the same page using the animation operation, which does not need a jump between pages, and thus, the operation becomes smoother. In addition, in the present disclosure, the non-overlapping area between the two mask layers is used as the triggering area of the operation of returning to the detail page, which makes the triggering area larger, and is very convenient for the one-handed operation on a handheld touch device. Thus, not only the smoothness of the operation is improved, but also the operational efficiency is enhanced.

BRIEF DESCRIPTION OF THE DRAWINGS

FIG. 4b is a schematic diagram of a display interface after the detail page in FIG. 4a scrolls up.

DETAILED DESCRIPTION OF EMBODIMENTS

The present disclosure will be further described below in detail in combination with the accompanying drawings and the embodiments.

Figure 1A:
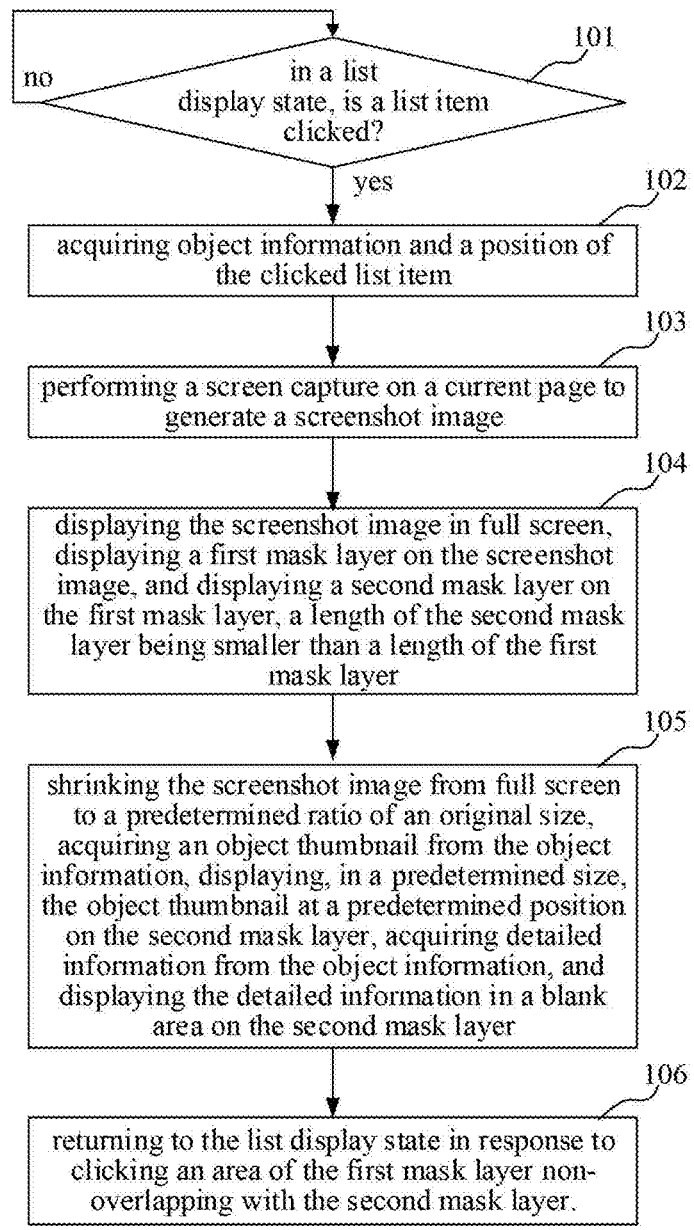
FIG. 1a is a flowchart of a method for displaying interface information according to the present disclosure.

FIG. 1a is a flowchart of a method for displaying interface information according to the present disclosure. Referring to FIG. 1a, the method mainly includes steps 101 to 106.

Step 101 includes in a list display state, if a click on a list item is detected, proceeding to step 102.

Step 102 includes: acquiring object information and a position of the clicked list item.

Step 103 includes performing a screen capture on a current page to generate a screenshot image.

Step 104 includes: displaying the screenshot image in full screen, displaying a first mask layer on the screenshot image, and displaying a second mask layer on the first mask layer, a length of the second mask layer being smaller than a length of the first mask layer.

Step 105 includes: shrinking the screenshot image from full screen to a predetermined ratio of an original size, acquiring an object thumbnail from the object information, displaying, in a predetermined size, the object thumbnail at a predetermined position on the second mask layer, acquiring detailed information from the object information, and displaying the detailed information in a blank area on the second mask layer.

Step 106 includes returning to the list display state in response to clicking an area of the first mask layer non-overlapping the second mask layer.

Figure 1B:
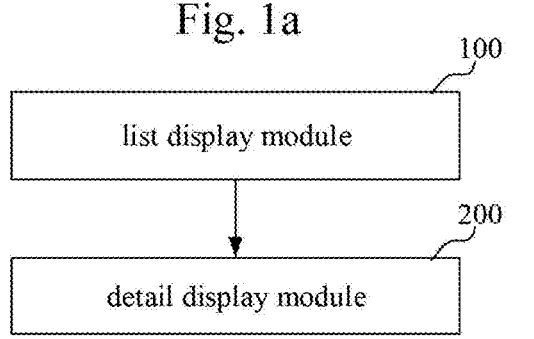
FIG. 1b is a schematic diagram of a composition of an apparatus for displaying interface information according to the present disclosure.

Corresponding to the above method, the present disclosure further discloses an apparatus for displaying interface information. FIG. 1b is a schematic diagram of a composition of an apparatus for displaying interface information according to the present disclosure. The apparatus for displaying interface information includes:

a list display module 100, configured to display a list state, acquire object information and a position of the clicked list item if a click on a list item is detected, perform a screen capture on a current page to generate a screenshot image, and trigger a detail display module; and the detail display module 200, configured to display the screenshot image in full screen, display a first mask layer on the screenshot image, display a second mask layer on the first mask layer, a length of the second mask layer being smaller than a length of the first mask layer, shrink the screenshot image from full screen to a predetermined ratio of an original size, acquire an object thumbnail from the object information, display, in a predetermined size, the object thumbnail at a predetermined position on the second mask layer, acquire detailed information from the object information, display the detailed information in a blank area on the second mask layer, and trigger the list display module to display the list state in response to clicking an area of the first mask layer non-overlapping with the second mask layer.

In a preferred embodiment of the present disclosure, the first mask layer is a black mask layer and the second mask layer is a white mask layer.

In a preferred embodiment of the present disclosure, the first mask layer is initially in a transparent state, and the second mask layer is initially in a transparent state. When the object thumbnail is displayed on the second mask layer, the transparency of the first mask is reduced to a first specified value. For example, the initial transparency of the first mask layer is 100%, and the first specified value may be 40%. When the detailed information is displayed on the second mask layer, the transparency of the second mask layer is reduced to a second specified value. The first specified value is greater than the second specified value. For example, when the initial transparency of the second mask layer is 100%, the second specified value may be 0% (i.e., non-transparent).

In order to enhance the display effect of the detail page of the present disclosure to be more intuitive to a user, and facilitate the user improving the operational efficiency of a related operation, in a preferred embodiment of the present disclosure, an animation operation may further be added to the display process of the detail page. For example, there may be following animation operations:

the shrinking the screenshot image from full screen to a predetermined ratio of an original size is specified as an animation tweening motion;

and/or the displaying, in a predetermined size, the object thumbnail at a predetermined position on the second mask layer is specified as moving gradually the object thumbnail from the position where the object thumbnail in the list display state is located to the predetermined position on the second mask layer and changing gradually the size of the object thumbnail to the predetermined size using the animation tweening motion;

and/or reducing the transparency of the first mask layer to the first specified value is specified as changing gradually the first mask layer from the initial transparent state to the transparency of the first specified value using the animation tweening motion;

and/or reducing the transparency of the second mask layer to the second specified value is specified as changing gradually the second mask layer from the initial transparent state to the transparency of the second specified value using the animation tweening motion.

In a further preferred embodiment, the returning to the list display state in response to clicking an area of the first mask layer non-overlapping with the second mask layer may also include an animation operation. The animation operation includes:

hiding the detailed information in the second mask layer, restoring the transparency of the second mask layer to the initial transparent state, and then hiding the second mask layer;

zooming the size of the object thumbnail in the detail page to a size of a list thumbnail in the list display state, and moving the thumbnail from the position of the thumbnail in the detail page to the position of the corresponding list item in the list display state;

restoring the first mask layer from the current transparency to the initial transparent state, and then hiding the first mask layer; and enlarging the shrunk screenshot image to be identical to a screen in size, and then hiding the screenshot image.

In addition, in another preferred embodiment, when displaying the detail page, the method described in the present disclosure may further include a scrolling event occurring according to viewing needs of the user, to further adjust the display state of the detail page, which makes the detail page more intuitive to the user, and the operational efficiency higher. When displaying the detail page, the specific operations of the scrolling event include:

step 1A including when a scrolling event occurs in an area of the second mask layer or the object thumbnail, proceeding to step 1B;

step 1B including determining whether a distance between a coordinate of the second mask layer and a top position of the page is reduced and reaches a first specified threshold, and proceeding to step 1C if the distance is reduced and reaches the first specified threshold, otherwise, proceeding to step 1D;

step 1C including shrinking gradually and displaying the object thumbnail with a scrolling operation, hiding the object thumbnail at last, and setting an object name of the clicked list item as a title of the current page;

step 1D including determining whether the distance between the coordinate of the second mask player and the top position of the page is enlarged and reaches a second specified threshold, and performing step 1E if the distance is enlarged and reaches the second specified threshold, otherwise, returning to step 1A; and step 1E including hiding a title bar, and enlarging gradually and displaying the object thumbnail with the scrolling operation.

Through the technical solution of the present disclosure, in the present disclosure, the detail display for the object of the clicked list item is implemented on the same page using the animation operation, which does not need a jump between pages, and thus, the operation becomes smoother. In addition, in the present disclosure, the non-overlapping area between the two mask layers is used as the triggering area of the operation of returning to the detail page, which makes the triggering area larger, and is very convenient for the one-handed operation on a handheld touch device. Thus, not only the smoothness of the operation is improved, but also the operational efficiency is enhanced.

The processing flow of the present disclosure will be further described below in detail according to the accompanying drawings.

Figure 2:
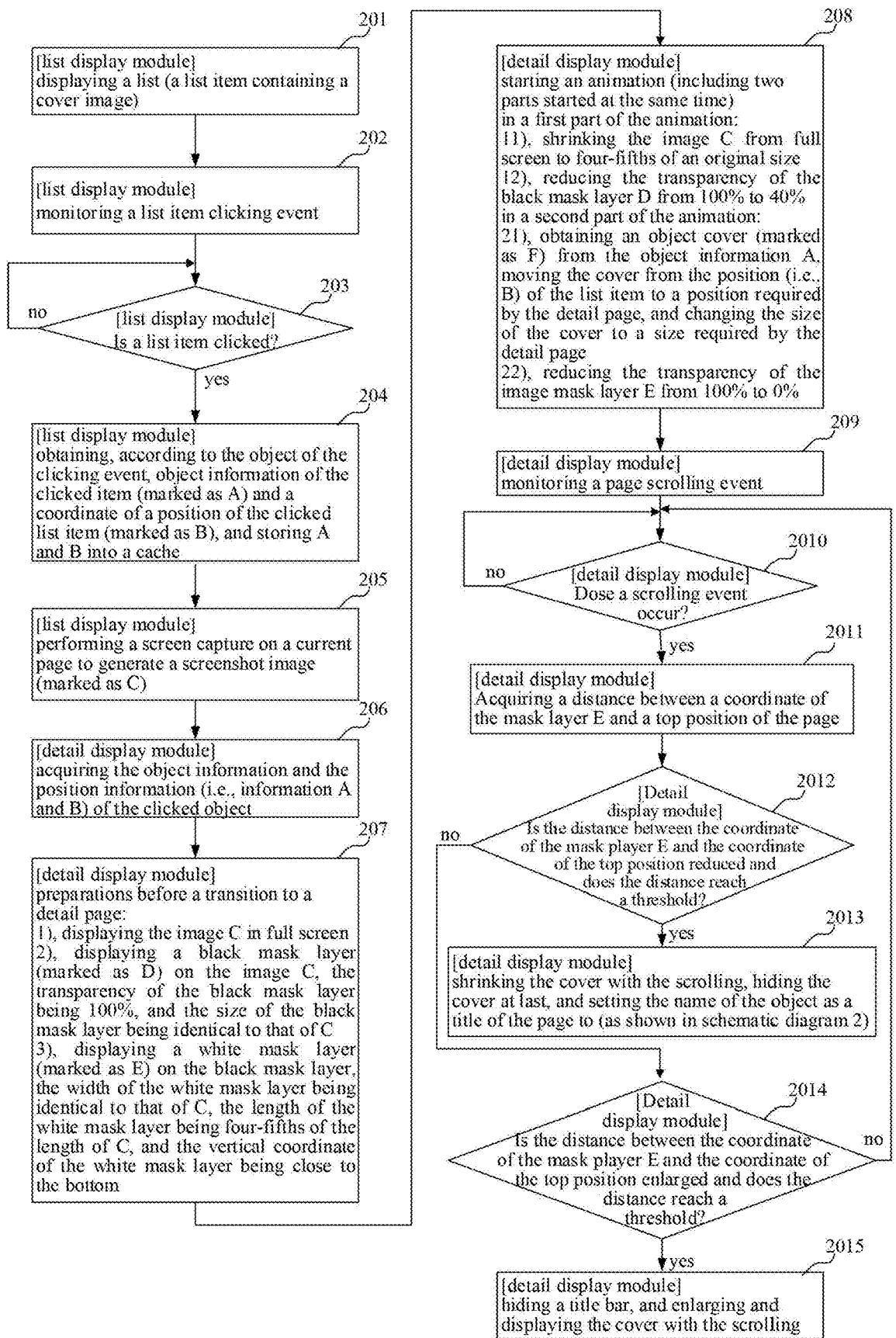
FIG. 2 is a processing flowchart of entering a detail page from a list page in the method according to the present disclosure.

FIG. 2 is a processing flowchart of entering a detail page from a list page in the method according to the present disclosure. Referring to FIG. 2, the flow includes steps 201 to 2015.

Figure 3A:
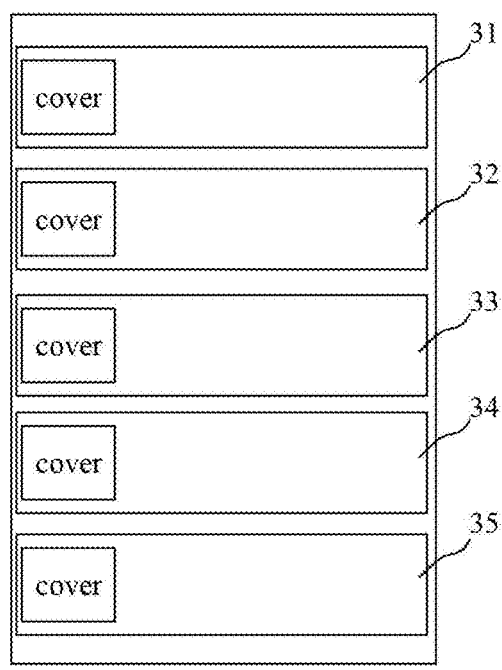
FIG. 3a is a schematic diagram of an interface of a list display state (i.e., the list page)

In step 201, a list display module displays a list. FIG. 3*a* is a schematic diagram of an interface of a list display state (i.e., the list page). The state in this case is the list display state, in which a plurality of list items (e.g., list items 31-35) are included in the list display state. Each list item corresponds to an object including an object thumbnail. For example, a cover in FIG. 3*a* is an object thumbnail.

In step 202, the list display module monitors a list item clicking event.

In step 203, step 204 is proceeded if the list display module detects a click on a list item. For example, it is assumed that the list item 31 is clicked.

In step 204, according to the object of the clicking event, the list display module obtains object information of the clicked list item (e.g., the object information of the list item 31 herein, and the object information of the clicked list item being marked as A according to the disclosure) and a coordinate of a position of the clicked list item (the coordinate being marked as B herein, and the coordinate being generally the coordinate of the upper left corner of the clicked list item), and stores A and B into a cache. The object information, for example, may include an object thumbnail and an introduction text for the object. For example, if the object is a book, the thumbnail may be the cover of the book. If the object is a commodity, the thumbnail may be an image of the commodity.

In step 205, the list display module performs a screen capture on a current page to generate a screenshot image (the screenshot image being marked as C here).

In step 206, a detail display module acquires the object information A and the position information B of the clicked list item.

Figure 3B:
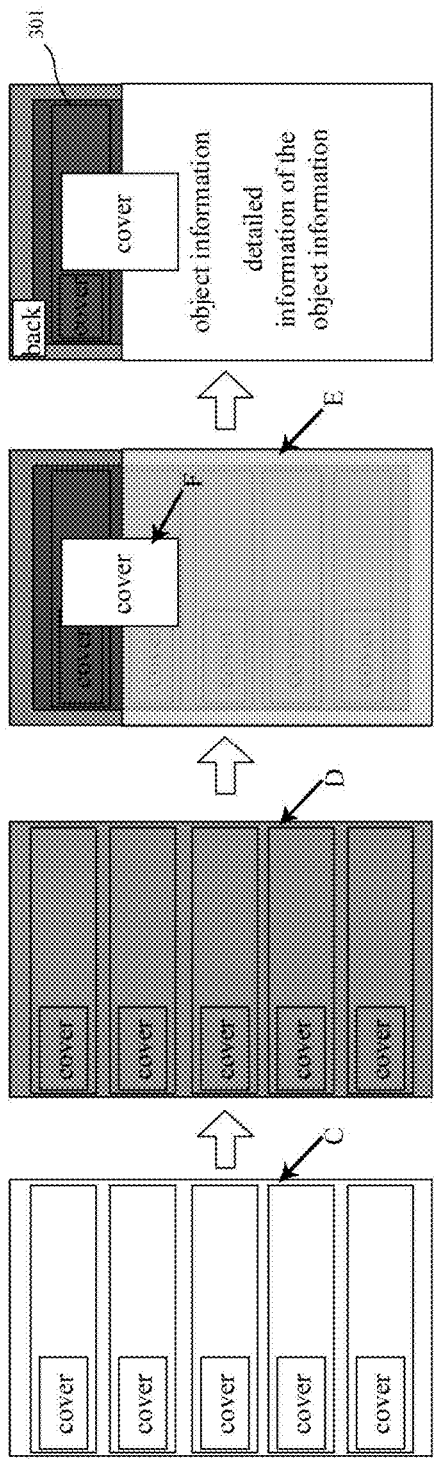
FIG. 3b is a schematic diagram of an interface of a transition from the list display state to the detail page.

FIG. 3b is a schematic diagram of an interface of a transition from the list display state to the detail page, which is described below in combination with FIG. 3b.

In step 207, the detail display module prepares for the transition to the detail page, which mainly includes:

1) displaying the screenshot image C in full screen;

2) displaying a first mask layer (i.e., a black mask layer marked as D) on the screenshot image C, the transparency of the first mask layer being 100%, and the size of the first mask layer being identical to that of C; and 3) displaying a second mask layer (i.e., a white mask layer marked as E) on the black mask layer D, the width of the second mask layer being identical to that of C, and the length of the second mask layer being a predetermined ratio k of the length of C. For example, in a preferred embodiment, the length of the white mask layer E is four-fifths of the length of the screenshot image C, and the vertical coordinate of the white mask layer E is aligned with the bottom of the screen.

In step 208, the detail display module starts an animation including two parts. The two parts of the animation are started simultaneously, which are respectively described as follows.

The first part of the animation includes:

11) shrinking the screenshot image C from full screen to a specified ratio j of an original size (e.g., in a preferred embodiment, j=4/5); and 12) reducing the transparency of the black mask layer D. For example, the transparency of the black mask layer D may be reduced from 100% to 40%, and the extent of reduction may be set according to an actual situation.

The second part of the animation includes:

21) acquiring an object thumbnail (marked as F) from the object information A, moving the thumbnail from the position (i.e., B) of the clicked list item to a position set by the detail page, and changing the size of the thumbnail to a size set by the detail page, where the set position and the set size may be preset by the detail page; and 22) reducing the transparency of the white mask layer E from 100% to 0%, blocking an image in a lower layer, reading the detailed information of the object from the object information A, and displaying the detailed information of the object on an upper layer of the white mask layer E. The white mask layer E and the above detailed information constitute the detail page of the present disclosure. However, the detail page is merely a layer, rather than a page.

Up to this point, the method for displaying the detailed information triggered by clicking a certain list item in the present disclosure is completed. As shown in FIG. 3b, in this case, if the user clicks the white mask layer E or the object thumbnail F, the interface does not return to the previous list display state (the state shown in FIG. 3a). If the user clicks the area 301 of the black mask layer D non-overlapping with the white mask layer E, or clicks the back button, the interface returns to the previous list display state (the state shown in FIG. 3a).

Figure 4A:
FIG. 4a is a schematic diagram of a detail page interface of a transition from a list display state to a detail page in an actual scenario.

FIG. 4a is a schematic diagram of a detail page interface of a transition from a list display state to a detail page in an actual scenario. The object thumbnail 401 of the clicked list item is displayed at the specified position of the detail page, and the detailed information of the clicked list item is displayed in the blank area 402 of the white mask layer. In this case, if the user clicks the area 400 of the black mask layer non-overlapping with the white layer, the interface returns to the list display state. If the user clicks on the white mask layer or the object thumbnail, the interface does not return to the list display state. Since the non-overlapping area 400 is large, when the user holds the touch device with one hand, it is very convenient for the one-handed operation of the user, thereby improving the operational efficiency.

If the current detail page needs to display a lot of detailed information, the detail page may be scrolled up and down by performing a scrolling operation on the detail page, to display more content.

When the user performs the scrolling operation on the white mask layer and the object thumbnail, there may be a display approach according to a further embodiment, as shown in the following steps 209-2015.

In step 209, the detail display module monitors a page scrolling event. The scrolling event, for example, refers to that the user scrolls up or down by dragging the area of the white mask layer E or the object thumbnail with a finger.

In step 2010, the detail display module determines whether the scrolling event occurs. If the scrolling event occurs, step 2011 is proceeded.

In step 2011, the detail display module acquires a distance between a coordinate of the white mask layer E and a top position of the page. The coordinate of the white mask layer E is generally the coordinate of the upper left corner of the white mask layer E. Alternatively, the coordinate may be the coordinate of the upper right corner of the white mask layer E or a position of other mark point.

In step 2012, the detail display module determines whether the distance between the coordinate of the white mask player E and the top position of the page is reduced and reaches a first specified threshold. If the distance is reduced and reaches the first specified threshold, step 2013 is proceeded, otherwise, step 2014 is proceeded.

Figure 4B:
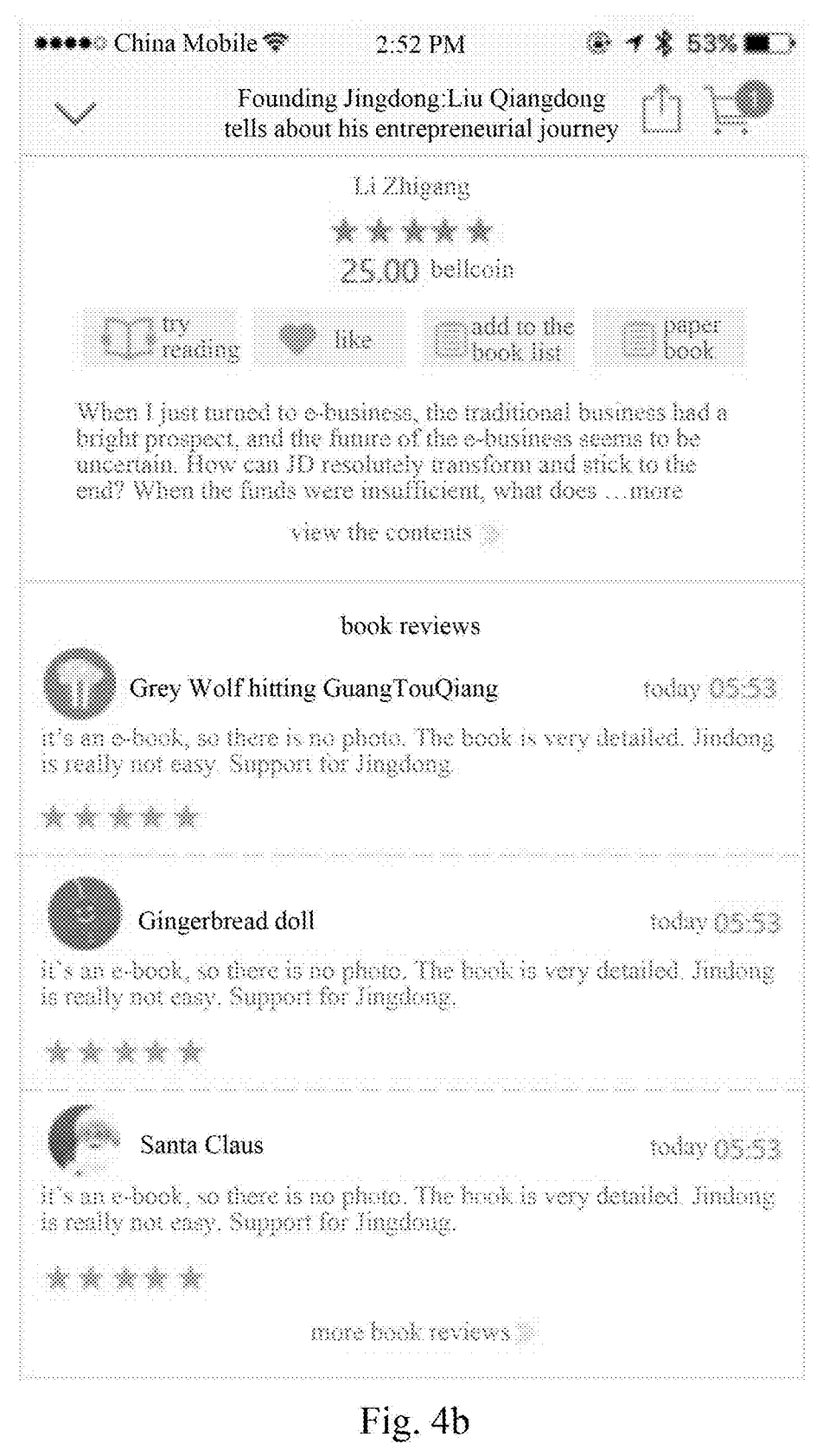

In step 2013, the displayed object thumbnail is gradually shrunk with the scrolling operation, and finally hidden. The name of the object of the clicked list item is set as the title of the current page, as shown in FIG. 4b.

In step 2014, whether the distance between the coordinate of the white mask player E and the top position of the page is enlarged and reaches a second specified threshold. If the distance is enlarged and reaches the second specified threshold, step 2015 is proceeded, otherwise, step 2010 is proceeded.

In step 2015, a title bar is hidden, and the displayed object thumbnail is gradually enlarged with the scrolling operation.

The display approach that can be realized in this way is: when the detail page scrolls up and the white mask layer E approaches the top, the object thumbnail is gradually shrunk and hidden. When the detail page scrolls down and the white mask player E is away from the top and toward down, the displayed object thumbnail is slowly enlarged.

Figure 5:
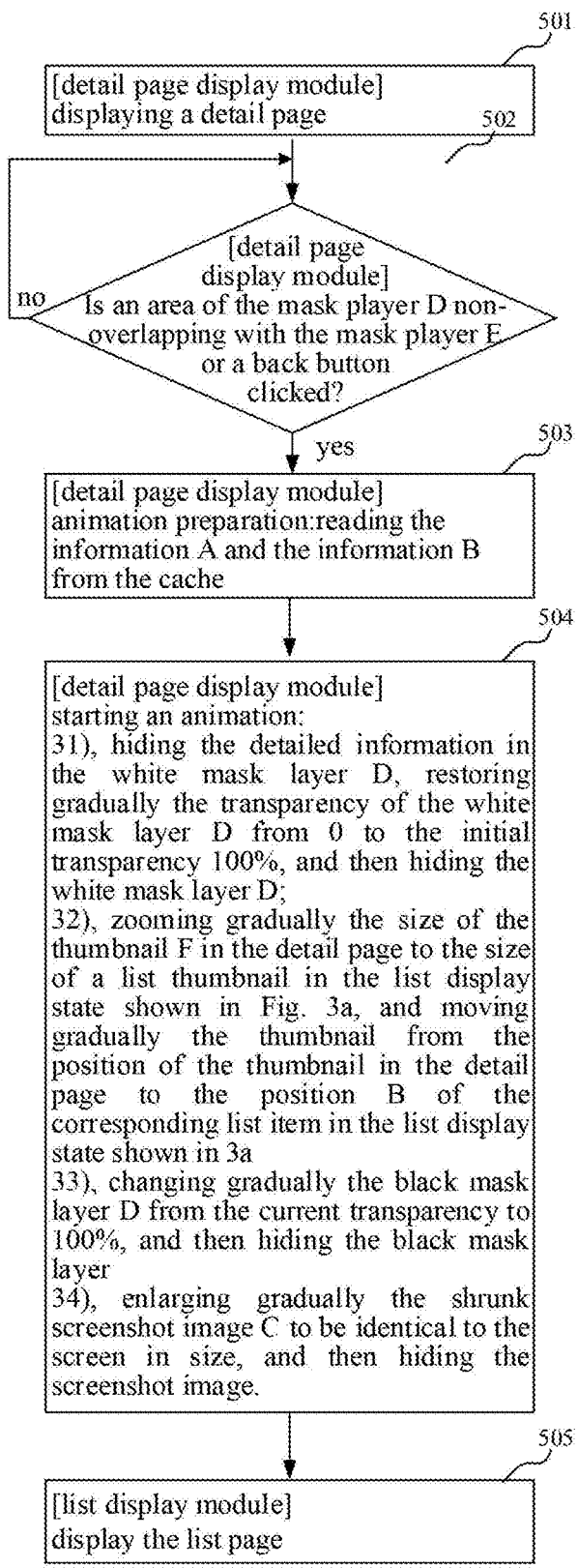
FIG. 5 is a processing flowchart of entering the list page from the detail page in the method according to the present disclosure.

FIG. 5 is a processing flowchart of entering the list page from the detail page in the method according to the present disclosure. Referring to FIG. 5, the flow includes steps 501 to 504.

In step 501, a detail page display module displays the detail page, for example, as shown in FIG. 3b or FIG. 4a.

In step 502, the detail page display module monitors whether the area 400 of the black mask player D non-overlapping with the white mask player E is clicked or the back button is clicked. and if the non-overlapping area 400 or the back button is clicked, step 503 is proceeded.

In step 503, an animation preparation operation is performed. That is, the object information A and the position B of the clicked list item are acquired from the cache.

Figure 3C:
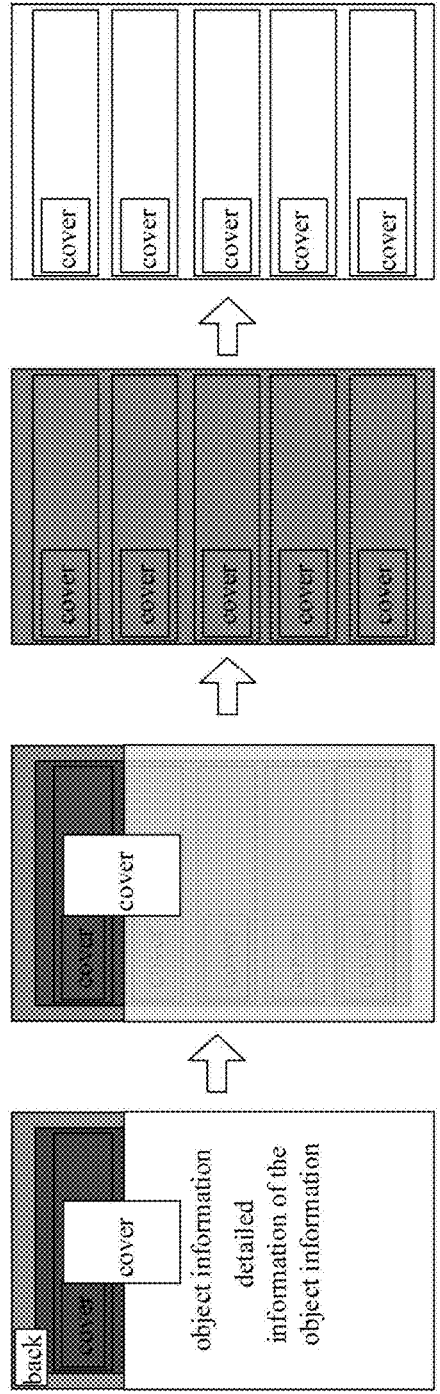
FIG. 3c is a schematic diagram of an interface of a transition from the detail page to the list display state.

In step 504, an animation operation is started, as shown in FIG. 3c, which is a schematic diagram of an interface of a transition from the detail page to the list display state. The animation operation mainly includes:

31) hiding the detailed information in the white mask layer D, restoring gradually the transparency of the white mask layer D from 0 to the initial transparency 100%, and then hiding the white mask layer D;

32) zooming gradually the size of the thumbnail F in the detail page to the size of a list thumbnail in the list display state shown in FIG. 3a, and moving gradually the thumbnail from the position of the thumbnail in the detail page to the position B of the corresponding list item in the list display state shown in 3a;

33) changing gradually the black mask layer D from the current transparency to 100%, and then hiding the black mask layer; and 34) enlarging gradually the shrunk screenshot image C to be identical to the screen in size, and then hiding the screenshot image.

In step 505, the animation is finished, and the list state displayed by the list display module is restored, as shown in FIG. 3a.

In the present disclosure, since the screenshot image for the list page is used, the user feels that the detail page is entered without leaving the list page, which makes the transition from the list page to the detail page more natural and smooth. The returning is to click the area of the black mask layer non-overlapping with the white mask layer, or the back button, which makes the intent more obvious.

In addition, each functional module in each embodiment of the present disclosure may be integrated into a processing unit or exist physically and separately, or two or more modules may be integrated into a unit. The integrated unit may be implemented by means of hardware or a software functional unit. The functional modules of the various embodiments may be located at a terminal or network node, or may be distributed to a plurality of terminals or network nodes.

In addition, each embodiment of the present disclosure may be implemented by a data processing program executed by a data processing device such as a computer. Obviously, the data processing program is included in the present disclosure. Moreover, the data processing program generally stored in a storage medium is executed by directly reading a program from the storage medium or by installing or copying the program to a storage device (e.g., a hard disk and/or a memory) of the data processing device. Therefore, such a storage medium is also included in the present disclosure. The storage medium may use any type of recording method, for example, a paper storage medium (e.g., a paper tape), a magnetic storage medium (e.g., a floppy disk, a hard disk and a flash memory), an optical storage medium (e.g., a CD-ROM) and a magneto-optical storage medium (e.g., MO).

Therefore, the present disclosure further discloses a storage medium, storing a data processing program. The data processing program is used to perform any embodiment of the method according to the present disclosure.

In addition, the steps in the method of the present disclosure may be implemented by a data processing program, or by hardware, for example, by a logic gate, a switch, an application specific integrated circuit (ASIC), a programmable logic controller, and an embedded microcontroller. Thus, such hardware that may implement the method of the present disclosure may also is included in the present disclosure.

The above is only the preferred embodiment of the present disclosure, and is not intended to limit the present disclosure. Any modifications, equivalent substitution, improvements, etc., which are made within the spirit and principles of the present disclosure, should be included in the scope of protection of the present disclosure.

What is claimed is:

1. A method for displaying interface information, comprising:
   performing an operation, in response to detecting
   a click on a list item in a display list state, the operation comprising:
   acquiring object information and a position of the clicked list item;
   performing a screen capture on a current page to generate a screenshot image, the current page being a page showing a list of items including the clicked list item;
   displaying the screenshot image in full screen, displaying a first mask layer on the screenshot image, and displaying a second mask layer on the first mask layer, a length of the second mask layer being smaller than a length of the first mask layer;
   shrinking the screenshot image from full screen to a predetermined ratio of an original size, acquiring an object thumbnail from the object information, displaying, in a predetermined size, the object thumbnail at a predetermined position on the second mask layer, acquiring detailed information from the object information, and displaying the detailed information in a blank area on the second mask layer; and
   returning to the list display state in response to clicking an area of the first mask layer non-overlapping with the second mask layer.

2. The method according to claim 1, wherein,
   the first mask layer is initially in a transparent state, and the second mask layer is initially in a transparent state; and
   when the object thumbnail is displayed on the second mask layer, a transparency of the first mask layer is reduced to a first specified value; when the detailed information is displayed on the second mask layer, a transparency of the second mask layer is reduced to a second specified value; and the first specified value is greater than the second specified value.

3. The method according to claim 2, wherein the second specified value is 0.

4. The method according to claim 2, wherein,
the shrinking the screenshot image from full screen to a predetermined ratio of an original size comprises an animation tweening motion; and/or
the displaying, in a predetermined size, the object thumbnail at a predetermined position on the second mask layer comprises: using the animation tweening motion, moving gradually the object thumbnail from a position where the object thumbnail in the list display state is to the predetermined position on the second mask layer and changing gradually a size of the object thumbnail to the predetermined size; and/or
reducing the transparency of the first mask layer to the first specified value comprises: changing gradually the first mask layer from the initial transparent state to the transparency of the first specified value using the animation tweening motion; and/or
reducing the transparency of the second mask layer to the second specified value comprises: changing gradually the second mask layer from the initial transparent state to the transparency of the second specified value using the animation tweening motion.

5. The method according to claim 2, wherein the returning to the list display state in response to clicking an area of the first mask layer non-overlapping with the second mask layer comprises:
hiding the detailed information in the second mask layer, restoring the transparency of the second mask layer to the initial transparent state, and then hiding the second mask layer;
zooming the size of the object thumbnail in the detail page to a size of a list thumbnail in the list display state, and moving the thumbnail from the position of the thumbnail in the detail page to the position of the corresponding list item in the list display state;
restoring the first mask layer from a current transparency to the initial transparent state, and then hiding the first mask layer; and
enlarging the shrunk screenshot image to be identical to a screen in size, and then hiding the screenshot image.

6. The method according to claim 1, wherein the first mask layer is a black mask layer and the second mask layer is a white mask layer.

7. The method according to claim 1, further comprising:
step 1A including when a scrolling event occurs in an area of the second mask layer or the object thumbnail, proceeding to step 1B:
step 1B including determining whether a distance between a coordinate of the second mask player and a top position of the page is reduced and reaches a first specified threshold, and proceeding to step 1C if the distance is reduced and reaches the first specified threshold, otherwise, proceeding to step 1D;
step 1C including shrinking gradually and displaying the object thumbnail with a scrolling operation, hiding the object thumbnail at last, and setting an object name of the clicked list item as a title of the current page;
step 1D including determining whether the distance between the coordinate of the second mask player and the top position of the page is enlarged and reaches a second specified threshold, and proceeding to step 1E if the distance is enlarged and reaches the second specified threshold, otherwise, returning to step 1A; and
step 1E including hiding a title bar, and enlarging gradually and displaying the object thumbnail with a scrolling operation.

8. An apparatus for displaying interface information, comprising:
a processor and a memory storing computer readable instructions, wherein the instructions, when executed by the processor, cause the processor to perform operations, the operations comprising:
displaying a list state, acquiring, if a click on a list item is detected, object information and a position of the clicked list item, performing a screen capture on a current page to generate a screenshot image, the current page being a page showing a list of items including the clicked list item;
displaying the screenshot image in full screen, displaying a first mask layer on the screenshot image, displaying a second mask layer on the first mask layer, a length of the second mask layer being smaller than a length of the first mask layer, shrinking the screenshot image from full screen to a predetermined ratio of an original size, acquiring an object thumbnail from the object information, displaying, in a predetermined size, the object thumbnail at a predetermined position on the second mask layer, acquiring detailed information from the object information, displaying the detailed information in a blank area on the second mask layer, and displaying the list state in response to clicking an area of the first mask layer non-overlapping with the second mask layer.

9. The apparatus according to claim 8, wherein the first mask layer is initially in a transparent state, and the second mask layer is initially in a transparent state; and
when the object thumbnail is displayed on the second mask layer, a transparency of the first mask layer is reduced to a first specified value; when the detailed information is displayed on the second mask layer, a transparency of the second mask layer is reduced to a second specified value; and the first specified value is greater than the second specified value.

10. The apparatus according to claim 8, wherein the second specified value is 0.

11. A non-volatile computer storage medium, storing computer readable instructions executable by a processor, the computer readable instructions, when executed by the processor, causing the processor to perform operations, the operations comprising:
performing an operation, in response to detecting a click on a list item in a display list state, the operation comprising:
acquiring object information and a position of the clicked list item;
performing a screen capture on a current page to generate a screenshot image, the current page being a page showing a list of items including the clicked list item;
displaying the screenshot image in full screen, displaying a first mask layer on the screenshot image, and displaying a second mask layer on the first mask layer, a length of the second mask layer being smaller than a length of the first mask layer;
shrinking the screenshot image from full screen to a predetermined ratio of an original size, acquiring an object thumbnail from the object information, displaying, in a predetermined size, the object thumbnail at a predetermined position on the second mask layer, acquiring detailed information from the object information, and displaying the detailed information in a blank area on the second mask layer; and returning to the list display state in response to clicking an area of the first mask layer non-overlapping with the second mask layer.

\* \* \* \* \*